US012688857B2

(12) United States Patent
Kamiya et al.

(10) Patent No.: US 12,688,857 B2
(45) Date of Patent: Jul. 21, 2026

(54) ENCODING DEVICE AND ENCODING METHOD

(71) Applicant: PANASONIC INTELLECTUAL PROPERTY CORPORATION OF AMERICA, Torrance, CA (US)

(72) Inventors: Yuichi Kamiya, Ishikawa (JP); Takuya Kawashima, Ishikawa (JP); Hiroyuki Ehara, Kanagawa (JP); Akira Harada, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 127 days.

(21) Appl. No.: 18/835,764

(22) PCT Filed: Jan. 26, 2023

(86) PCT No.: PCT/JP2023/002481
§ 371 (c)(1),
(2) Date: Aug. 5, 2024

(87) PCT Pub. No.: WO2023/153228
PCT Pub. Date: Aug. 17, 2023

(65) Prior Publication Data

US 2025/0191596 A1 Jun. 12, 2025

(30) Foreign Application Priority Data

Feb. 8, 2022 (JP) ................................ 2022-017997
Sep. 9, 2022 (JP) ................................ 2022-143856

(51) Int. Cl.
*G10L 19/008* (2013.01)
*G10L 19/02* (2013.01)
*G10L 19/12* (2013.01)

(52) U.S. Cl.
CPC ............ *G10L 19/008* (2013.01); *G10L 19/02* (2013.01); *G10L 19/12* (2013.01)

(58) Field of Classification Search
None
See application file for complete search history.

(56) References Cited

U.S. PATENT DOCUMENTS 5,812,672 A 9/1998 Herre et al.
2008/0130903 A1 * 6/2008 Ojanpera ............. G10L 19/008 381/2

(Continued)

FOREIGN PATENT DOCUMENTS

JP 7-501190 2/1995
JP 2004-325633 11/2004

(Continued)

OTHER PUBLICATIONS

International Search Report (ISR) from International Searching Authority (Japan Patent Office) in International Pat. Appl. No. PCT/JP2023/002481, dated Apr. 18, 2023, together with an English language translation.

(Continued)

*Primary Examiner* — Douglas Godbold
(74) *Attorney, Agent, or Firm* — Greenblum & Bernstein, P.L.C.

(57) ABSTRACT

An encoding device includes a control circuit which, when it has been determined that an input stereo signal is suitable to be encoded using a mid-side stereo technique, decides, according to a condition, whether to convert the input stereo signal into a mid-side signal in a time domain and apply first encoding or apply second encoding; a first encoding circuit that encodes the mid-side signal when the first encoding is (Continued)

to be applied; and a second encoding circuit that encodes the input stereo signal in a frequency domain when the second encoding is to be applied.

11 Claims, 10 Drawing Sheets

(56) References Cited

U.S. PATENT DOCUMENTS

| | | | | |
|---|---|---|---|---|
| 2011/0238425 | A1* | 9/2011 | Neuendorf | G10L 19/173 704/500 |
| 2015/0235646 | A1* | 8/2015 | Miyasaka | G10L 19/24 381/23 |
| 2016/0210974 | A1* | 7/2016 | Disch | G10L 19/0204 |
| 2017/0365263 | A1* | 12/2017 | Disch | G10L 19/13 |
| 2018/0330740 | A1 | 11/2018 | Ravelli et al. | |
| 2019/0066701 | A1* | 2/2019 | Fatus | G10L 19/008 |
| 2019/0108843 | A1* | 4/2019 | Atti | G10L 19/008 |
| 2020/0176000 | A1* | 6/2020 | Li | G10L 19/008 |
| 2020/0357417 | A1* | 11/2020 | Nagisetty | G10L 19/22 |
| 2021/0012784 | A1* | 1/2021 | Fotopoulou | G10L 19/008 |
| 2025/0063162 | A1* | 2/2025 | Norvell | H04N 19/117 |

FOREIGN PATENT DOCUMENTS

| | | |
|---|---|---|
| JP | 2019-506633 | 3/2019 |
| JP | 2021-119383 | 8/2021 |

OTHER PUBLICATIONS

"3rd Generation Partnership Project; Technical Specification Group Services and System Aspects; Codec for Enhanced Voice Services (EVS); Detailed Algorithmic Description (Release 16)", 3GPP TS 26.445 V16.2.0, Dec. 2021.

Takehiro Sugimoto et al., "Angular resolution required for reproduction of speech on the arbitrary radiation direction: Examination in the horizontal and median planes", Proc. Autumn Meet. Acoust. Soc. Jpn., 2-8-8, Sep. 2021, together with a partial English language translation.

* cited by examiner

```
IF(Frame that has switched to stereo TD){
  Input L and R signals as they are
}ELSE IF(Frame that is to switch to stereo FD){
  IF(L channel has been shifted to the past direction on the time axis){
    Input L channel after restoring L channel (gradually reducing the number of shifts (time-axis compressing))
    Input R channel as it is
  }ELSE IF(R channel has been shifted to the past direction on the time axis){
    Input R channel after restoring R channel (gradually reducing the number of shifts (time-axis compressing))
    Input L channel as it is
  }ELSE{ /* ITD==0 */
    Input L and R signals as they are
  }
}ELSE{ /* Frame following and followed by stereo TD */
  IF(ITD has changed){
    IF(L channel has been shifted to the past direction and the number of shifts has reduced){
      Input L channel after gradually reducing the number of shifts of L channel (time-axis compressing)
      Input R channel as it is
    }ELSE IF(R channel has been shifted to the past direction and the number of shifts has reduced) */
      Input R channel after gradually reducing the number of shifts of R channel (time-axis compressing)
      Input L channel as it is
    }ELSE IF(L channel has been shifted to the past direction and the number of shifts has increased){
      Input L channel after gradually increasing the number of shifts of L channel (time-axis extending)
      Input R channel as it is
    }ELSE{ /* R channel has been shifted to the past direction and the number of shifts has increased */
      Input R channel after gradually increasing the number of shifts of R channel (time-axis extending)
      Input L channel as it is
    }
  }ELSE{ /* ITD does not change */
    IF(L channel has been shifted to the past direction){
      Input shifted L channel
      Input R channel as it is
    }ELSE{ /* R channel has been shifted to the past direction */
      Input L channel as it is
      Input shifted L channel
    }
  }
}
※The numbers of shifts are positive numbers
```

FIG. 6

```
{ 0,            0,           0,            0,           0,            0,           1,           0,            0,           0,            0,            0,            0},            → NO CHANGE
{ -0.0069731f,  0.0083794f,  -0.010496f,   0.014044f,   -0.021216f,   0.043354f,   0.99715f,    -0.039886f,   0.02035f,    -0.01366f,    0.01028f,     -0.0082409f,  0.0068769f }  → SHIFT TO FUTURE DIRECTION BY 1/24 SAMPLE
{ -0.013924f,   0.016756f,   -0.021034f,   0.028246f,   -0.042983f,   0.089874f,   0.98862f,    -0.076047f,   0.039545f,   -0.026719f,   0.020176f,    -0.016207f,   0.013543f },   →  "  BY 2/24 SAMPLE
{ -0.020734f,   0.024987f,   -0.031435f,   0.042369f,   -0.064966f,   0.13921f,    0.9745f,     -0.10828f,    0.057323f,   -0.03898f,    0.02953f,     -0.023768f,   0.019888f },   →  "  BY 3/24 SAMPLE
{ -0.027284f,   0.032929f,   -0.041519f,   0.056172f,   -0.086812f,   0.19099f,    0.95493f,    -0.13642f,    0.073456f,   -0.050259f,   0.038197f,    -0.030804f,   0.025809f },   →  "  BY 4/24 SAMPLE
{ -0.033458f,   0.04044f,    -0.051105f,   0.069412f,   -0.10815f,    0.24477f,    0.93012f,    -0.16037f,    0.087747f,   -0.060397f,   0.046045f,    -0.037205f,   0.031212f },   →  "  BY 5/24 SAMPLE
{ -0.039144f,   0.047385f,   -0.060021f,   0.081847f,   -0.12862f,    0.30011f,    0.90032f,    -0.18006f,    0.10004f,    -0.069255f,   0.05296f,     -0.042872f,   0.036013f },   →  "  BY 6/24 SAMPLE
{ -0.044239f,   0.053635f,   -0.068099f,   0.093243f,   -0.14782f,    0.35652f,    0.86582f,    -0.19551f,    0.1102f,     -0.076719f,   0.058842f,    -0.047723f,   0.040138f },   →  "  BY 7/24 SAMPLE
{ -0.048647f,   0.059071f,   -0.075181f,   0.10337f,    -0.1654f,     0.4135f,     0.82699f,    -0.20675f,    0.11814f,    -0.082699f,   0.063615f,    -0.051687f,   0.043526f },   →  "  BY 8/24 SAMPLE
{ -0.052281f,   0.063585f,   -0.081126f,   0.11203f,    -0.18097f,    0.47053f,    0.78421f,    -0.21388f,    0.12382f,    -0.087135f,   0.067218f,    -0.054713f,   0.04613f },    →  "  BY 9/24 SAMPLE
{ -0.055068f,   0.067083f,   -0.085804f,   0.11902f,    -0.19419f,    0.52708f,    0.73791f,    -0.21703f,    0.12723f,    -0.089989f,   0.069614f,    -0.056763f,   0.047916f },   →  "  BY 10/24 SAMPLE
{ -0.056948f,   0.069487f,   -0.089107f,   0.12417f,    -0.2047f,     0.58262f,    0.68855f,    -0.2164f,     0.12837f,    -0.091254f,   0.070786f,    -0.057817f,   0.048865f },   →  "  BY 11/24 SAMPLE
{ -0.057875f,   0.070736f,   -0.090946f,   0.12732f,    -0.21221f,    0.63662f,    0.63662f,    -0.21221f,    0.12732f,    -0.090946f,   0.070736f,    -0.057875f,   0.048971f },   →  "  BY 12/24 SAMPLE
{ -0.057817f,   0.070786f,   -0.091254f,   0.12837f,    -0.2164f,     0.68855f,    0.58262f,    -0.2047f,     0.12417f,    -0.089107f,   0.069487f,    -0.056948f,   0.048243f },   →  "  BY 13/24 SAMPLE
{ -0.056763f,   0.069614f,   -0.089989f,   0.12723f,    -0.21703f,    0.73791f,    0.52708f,    -0.19419f,    0.11902f,    -0.085804f,   0.067083f,    -0.055068f,   0.046703f },   →  "  BY 14/24 SAMPLE
{ -0.054713f,   0.067218f,   -0.087135f,   0.12382f,    -0.21388f,    0.78421f,    0.47053f,    -0.18097f,    0.11203f,    -0.081126f,   0.063585f,    -0.052281f,   0.044389f },   →  "  BY 15/24 SAMPLE
{ -0.051687f,   0.063615f,   -0.082699f,   0.11814f,    -0.20675f,    0.82699f,    0.4135f,     -0.1654f,     0.10337f,    -0.075181f,   0.059071f,    -0.048647f,   0.04135f },    →  "  BY 16/24 SAMPLE
{ -0.047723f,   0.058842f,   -0.076719f,   0.1102f,     -0.19551f,    0.86582f,    0.35652f,    -0.14782f,    0.093243f,   -0.068099f,   0.053635f,    -0.044239f,   0.037645f },   →  "  BY 17/24 SAMPLE
{ -0.042872f,   0.05296f,    -0.069255f,   0.10004f,    -0.18006f,    0.90032f,    0.30011f,    -0.12862f,    0.081847f,   -0.060021f,   0.047385f,    -0.039144f,   0.033345f },   →  "  BY 18/24 SAMPLE
{ -0.037205f,   0.046045f,   -0.060397f,   0.087747f,   -0.16037f,    0.93012f,    0.24477f,    -0.10815f,    0.069412f,   -0.051105f,   0.04044f,     -0.033458f,   0.028531f },   →  "  BY 19/24 SAMPLE
{ -0.030804f,   0.038197f,   -0.050259f,   0.073456f,   -0.13642f,    0.95493f,    0.19099f,    -0.086812f,   0.056172f,   -0.041519f,   0.032929f,    -0.027284f,   0.023291f },   →  "  BY 20/24 SAMPLE
{ -0.023768f,   0.02953f,    -0.03898f,    0.057323f,   -0.10828f,    0.9745f,     0.13921f,    -0.064966f,   0.042369f,   -0.031435f,   0.024987f,    -0.020734f,   0.017718f },   →  "  BY 21/24 SAMPLE
{ -0.016207f,   0.020176f,   -0.026719f,   0.039545f,   -0.076047f,   0.98862f,    0.089874f,   -0.042983f,   0.028246f,   -0.021034f,   0.016756f,    -0.013924f,   0.011911f },   →  "  BY 22/24 SAMPLE
{ -0.0082409f,  0.01028f,    -0.01366f,    0.02035f,    -0.039886f,   0.99715f,    0.043354f,   -0.021216f,   0.014044f,   -0.010496f,   0.0083794f,   -0.0069731f,  0.0059709f }  →  "  BY 23/24 SAMPLE
{ 0,            0,           0,            0,           0,            1,           0,           0,            0,           0,            0,            0,            0},            → SHIFT TO FUTURE DIRECTION BY ONE SAMPLE
```

FIG. 7

| | M/S | M/S→LR | LR | LR→M/S | MS |
|---|---|---|---|---|---|
| mixing | $\begin{pmatrix}M_n\\S_n\end{pmatrix}=D\begin{pmatrix}L_n\\R_n\end{pmatrix}$, $D=\begin{pmatrix}0.5 & 0.5\\-0.5 & 0.5\end{pmatrix}$ | $\begin{pmatrix}M_n\\S_n\end{pmatrix}=D\begin{pmatrix}L_n\\R_n\end{pmatrix}$, $D=\frac{1}{2}\begin{pmatrix}1+\alpha_n & 1-\alpha_n\\-1+\alpha_n & 1+\alpha_n\end{pmatrix}$, $\alpha_n=\frac{n}{N}, n=0,\cdots,N-1$ | No mixing processing in time domain is performed because FD encoding is performed | $\begin{pmatrix}M_n\\S_n\end{pmatrix}=D\begin{pmatrix}L_n\\R_n\end{pmatrix}$, $D=\frac{1}{2}\begin{pmatrix}2-\alpha_n & \alpha_n\\-\alpha_n & 2-\alpha_n\end{pmatrix}$, $\alpha_n=\frac{n}{N}, n=0,\cdots,N-1$ | $\begin{pmatrix}M_n\\S_n\end{pmatrix}=D\begin{pmatrix}L_n\\R_n\end{pmatrix}$, $D=\begin{pmatrix}0.5 & 0.5\\-0.5 & 0.5\end{pmatrix}$ |
| inverse mixing | $\begin{pmatrix}L_n\\R_n\end{pmatrix}=U\begin{pmatrix}M_n\\S_n\end{pmatrix}$, $U=\begin{pmatrix}1 & -1\\1 & 1\end{pmatrix}$ | $\begin{pmatrix}L_n\\R_n\end{pmatrix}=\frac{1}{1+\alpha_n^2}U\begin{pmatrix}M_n\\S_n\end{pmatrix}$, $U=\begin{pmatrix}1+\alpha_n & -1+\alpha_n\\1-\alpha_n & 1+\alpha_n\end{pmatrix}$, $\alpha_n=\frac{n}{N}, n=0,\cdots,N-1$ | No mixing processing in time domain is performed because FD decoding is performed | $\begin{pmatrix}L_n\\R_n\end{pmatrix}=\frac{1}{1-\alpha_n+0.5\alpha_n^2}U\begin{pmatrix}M_n\\S_n\end{pmatrix}$, $U=\begin{pmatrix}1-\frac{1}{2}\alpha_n & -\frac{1}{2}\alpha_n\\\frac{1}{2}\alpha_n & 1-\frac{1}{2}\alpha_n\end{pmatrix}$, $\alpha_n=\frac{n}{N}, n=0,\cdots,N-1$ | $\begin{pmatrix}L_n\\R_n\end{pmatrix}=U\begin{pmatrix}M_n\\S_n\end{pmatrix}$, $U=\begin{pmatrix}1 & -1\\1 & 1\end{pmatrix}$ |
| coding mode | | MDCT-based × 2ch | | MDCT-based × 2ch | |

FIG. 9

ENCODING DEVICE AND ENCODING METHOD

TECHNICAL FIELD

The present disclosure relates to an encoding apparatus and an encoding method.

BACKGROUND ART

For example, a low bit rate encoding technique for speech acoustic signals is developed (e.g., see Non-Patent Literature (hereinafter, referred to as NPL) 1).

CITATION LIST

Patent Literature

PTL 1
Japanese Patent Application Laid-Open No. 2021-119383
PTL 2
Japanese Patent Application Laid-Open No. H7-501190

Non-Patent Literature

NPL 1
3GPP TS 26.445 V16.2.0, "Codec for Enhanced Voice Services (EVS); Detailed Algorithmic Description (Release 16)", 2021-12.
NPL 2
Takehiro SUGIMOTO, Kotaro KINOSHITA, "Angular resolution required for reproduction of speech on the arbitrary radiation direction: Examination in the horizontal and median planes," Proc. Autumn Meet. Acoust. Soc. Jpn., 2-8-8, September 2021

SUMMARY OF INVENTION

There is room for study on a method for enhancing coding performance for speech acoustic signals at low bit rates.

A non-limiting embodiment of the present disclosure facilitates providing an encoding apparatus and an encoding method each capable of enhancing coding performance for speech acoustic signals at low bit rates.

An encoding apparatus according to an embodiment of the present disclosure includes: control circuitry, which, in operation, determines, when determining that an input stereo signal is suitable for encoding using a mid-side stereo scheme, either conversion of the input stereo signal into a mid-side signal in a time domain and application of first encoding or application of second encoding, depending on a condition; first encoding circuitry, which, in operation, encodes the mid-side signal when the first encoding is applied; and second encoding circuitry, which, in operation, encodes the input stereo signal in a frequency domain when the second encoding is applied.

It should be noted that general or specific embodiments may be implemented as a system, an apparatus, a method, an integrated circuit, a computer program, a storage medium, or any selective combination thereof.

According to an embodiment of the present disclosure, it is possible to enhance coding performance for speech acoustic signals at low bit rates.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6 illustrates an exemplary pseudo-code of ITD adjustment processing;

FIG. 7 illustrates an exemplary Finite Impulse Response (FIR) filtering coefficient set used for ITD adjustment processing;

FIG. 9 illustrates exemplary transition of channel conversion in the encoding system.

DESCRIPTION OF EMBODIMENTS

Hereinafter, an embodiment of the present disclosure will be described in detail with reference to the accompanying drawings.

Patent Literature (hereinafter, referred to as PTL) 1 discloses a high-efficiency Modified Discrete Cosine Transform (MDCT) stereo coding scheme that combines a Mid-Side (M/S) stereo scheme and a Left-Right (LR) stereo scheme. Further, for example, a method for switching between an M/S stereo scheme and an LR stereo scheme in transform coding for stereo signals are known (e.g., see PTLs 1 and 2).

For example, the coding performance for speech signals at low bit rates is possibly insufficient in the MDCT coding (or referred to as MDCT-based coding) disclosed in PTL 1.

Further, for example, in PTL 1, a "full Mid-Side coding mode," in which an M/S stereo scheme is configured in all of a plurality of sub-bands obtained by dividing a spectrum of an input stereo signal (e.g., also referred to as frequency band or spectrum band), may be selected. In PTL 1, an MDCT-based coding scheme is applied when the full Mid-Side coding mode is selected, but using Code Excited Prediction (CELP) coding (also referred to as CELP-based coding) possibly improves coding performance for speech signals better depending on a bit rate.

Further, for example, while the introduction of CELP coding can improve the coding performance, in coding of speech signals using an M/S stereo scheme, an inter-channel time difference (ITD) easily affects the coding performance. Thus, when the inter-channel time-difference (ITD) is not zero in coding of speech signals using the M/S stereo scheme, the coding performance for stereo signals using CELP coding possibly deteriorates or is insufficient.

Then, in an embodiment of the present disclosure, a method for enhancing coding performance for speech signals at low bit rates will be described.

[Exemplary Configuration of Encoding System]

Figure 1:
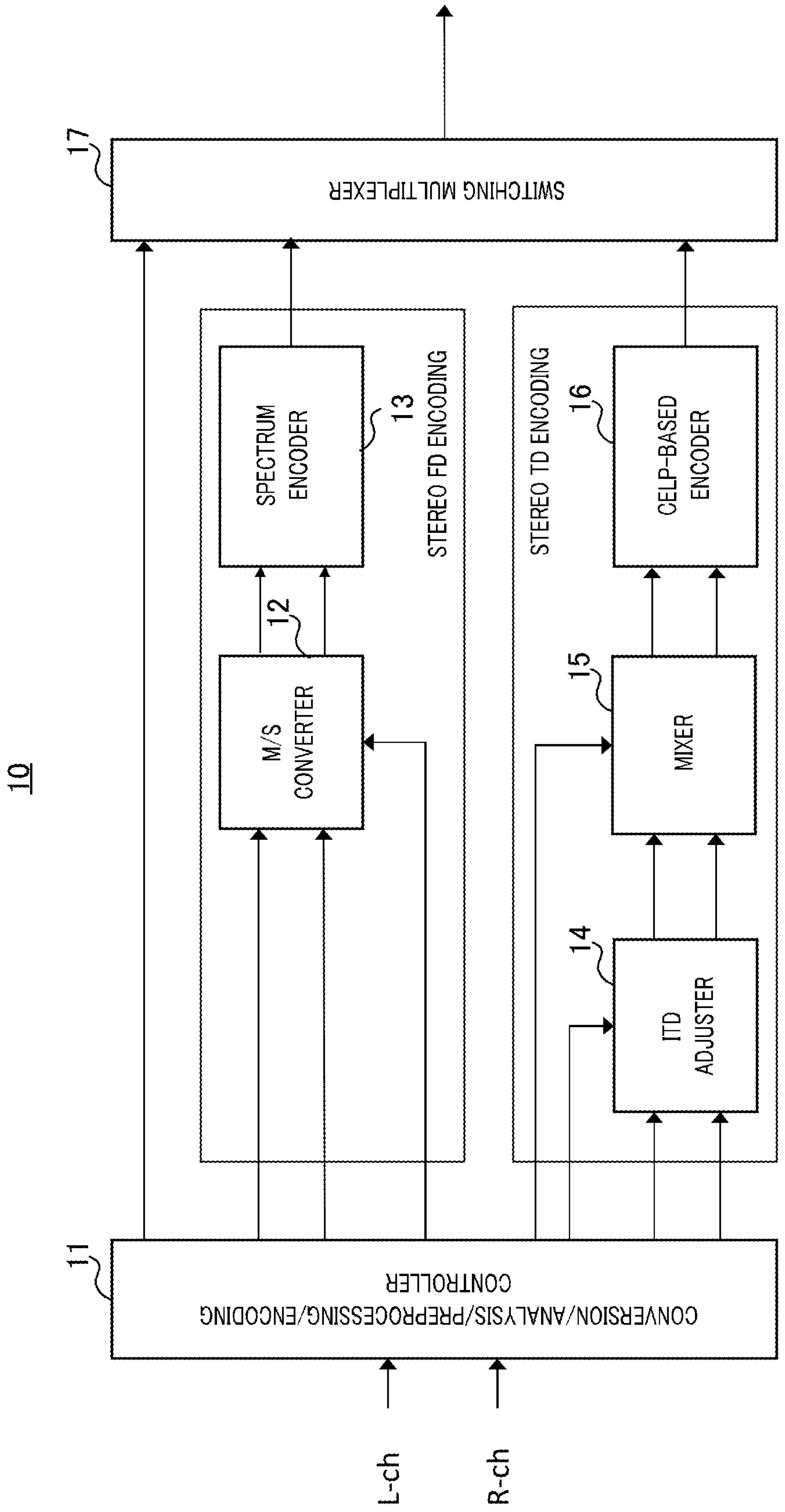
FIG. 1 illustrates an exemplary configuration of an encoding system.

FIG. 1 illustrates an exemplary configuration of encoding apparatus 10 (or referred to as "encoding system").

Encoding apparatus 10 may include, for example, conversion/analysis/preprocessing/encoding controller 11, M/S converter 12, spectrum encoder 13, ITD adjuster 14, mixer 15, CELP-based encoder 16, and switching multiplexer 17.

For example, to conversion/analysis/preprocessing/encoding controller 11, stereo signals including an L channel (Left channel) and an R channel (Right channel) may be inputted.

Conversion/analysis/preprocessing/encoding controller 11 may, for example, convert the L channel and R channel signals into signals in the frequency domain, and may output the L channel and R channel signals converted into signals in the frequency domain to M/S converter 12. The conversion processing in conversion/analysis/preprocessing/encoding controller 11 may be processing of converting signals in the time domain into parameters of the frequency domain (spectrum parameter), such as Fast Fourier Transform (FFT), Discrete Fourier Transform (DFT), or MDCT.

Further, conversion/analysis/preprocessing/encoding controller 11 may, for example, control M/S conversion in M/S converter 12, and may output information on M/S conversion (e.g., referred to as "M/S conversion control information") to M/S converter 12. M/S conversion control information may include, for example, information on whether to perform LR-M/S conversion in M/S converter 12, or information on a sub-band on which LR-M/S conversion is performed.

Further, conversion/analysis/preprocessing/encoding controller 11 may, for example, output the L channel and R channel signals in the time domain to ITD adjuster 14. Furthermore, conversion/analysis/preprocessing/encoding controller 11 may perform, for example, control related to ITD adjustment, and output control information on ITD adjustment (e.g., referred to as "ITD adjustment control information") to ITD adjuster 14. The ITD adjustment control information may be, for example, information indicating an ITD adjustment value or information for determining an ITD adjustment value in ITD adjuster 14.

In addition, conversion/analysis/preprocessing/encoding controller 11 may, for example, control mixing in mixer 15, and may output control information on mixing (e.g., referred to as "mixing control information") to mixer 15. The mixing control information may include, for example, information on a parameter (example will be described later) used for mixing in mixer 15.

Moreover, conversion/analysis/preprocessing/encoding controller 11 may perform analysis processing of analyzing characteristics of the L channel and R channel signals, for example. The analysis processing may, for example, include processing such as Inter-channel Cross Correlation (ICC) analysis, inter-channel time difference (ITD) analysis, Inter-channel Level Difference (ILD) analysis, or pitch analysis. Conversion/analysis/preprocessing/encoding controller 11 may, for example, output information on the analysis result (e.g., referred to as "analysis information") to ITD adjuster 14 or another component.

In addition, conversion/analysis/preprocessing/encoding controller 11 may perform preprocessing such as pre-emphasis or auditory masking (or perceptual weighting).

Further, conversion/analysis/preprocessing/encoding controller 11 may, for example, perform control of switching coding modes, and may output control information on switching of coding modes (e.g., referred to as "coding mode information") to switching multiplexer 17. The coding mode information may include, for example, a coding mode to be applied between encoding of a stereo signal in the frequency domain (e.g., referred to as "stereo Frequency Domain (FD) encoding") and encoding of a stereo signal in the time domain (e.g., referred to as "stereo Time domain (TD) encoding").

In encoding apparatus 10, M/S converter 12 and spectrum encoder 13 may constitute a stereo FD encoder (e.g., corresponding to second encoding circuitry) that performs stereo FD encoding.

M/S converter 12 receives, for example, the L channel and R channel signals in the frequency domain (e.g., spectrum parameters) and M/S conversion control information from conversion/analysis/preprocessing/encoding controller 11. For example, M/S converter 12 may perform LR-M/S conversion processing on the spectrum parameters of the L channel and R channel based on the M/S conversion control information. M/S converter 12 outputs the spectrum parameters (two channels) after the LR-M/S conversion processing to spectrum encoder 13, for example.

Note that M/S converter 12 may perform LR-M/S conversion processing on every sub-band. Alternatively, the M/S conversion control information may include information indicating whether to perform LR-M/S conversion on every sub-band, and M/S converter 12 may perform LR-M/S conversion processing based on the M/S conversion control information. Alternatively, the M/S conversion control information may include information indicating whether to perform LR-M/S conversion on a plurality of sub-bands (e.g., some or all of sub-bands), and M/S converter 12 may perform LR-M/S conversion processing based on the M/S conversion control information.

Spectrum encoder 13 performs processing of encoding the spectrum parameters of the two channels inputted from M/S converter 12, and outputs the encoding result (e.g., referred to as "stereo FD encoding information") to switching multiplexer 17.

In encoding apparatus 10, ITD adjuster 14, mixer 15, and CELP-based encoder 16 may constitute a stereo TD encoder (e.g., corresponding to first encoding circuitry) that performs stereo TD encoding.

ITD adjuster 14 may receive, for example, L channel and R channel signals in the time domain after preprocessing, the ITD adjustment control information, and the analysis information from conversion/analysis/preprocessing/encoding controller 11. ITD adjuster 14 may, for example, perform, on the L channel and R channel signals, adjustment processing for reducing the absolute value of ITD to less than or equal to a threshold (e.g., adjustment processing for bringing the absolute value of ITD close to zero) based on the ITD adjustment control information (e.g., referred to as ITD adjustment processing). ITD adjuster 14 may output the L channel and R channel signals after the ITD adjustment processing to mixer 15. Note that exemplary ITD adjustment processing in ITD adjuster 14 will be described later.

Note that the ITD adjustment processing may be performed on the encoder side, and need not be performed on the decoder side (e.g., decoding processing need not be performed on the decoder side). Further, for example, at least one of an upper limit and a lower limit may be set to the maximum number of shifts (e.g., the number of samples) that can be adjusted (e.g., shiftable). For example, it is known that the angular resolution required for reproduction of speech in any three-dimensional radiation direction (e.g., also referred to as azimuthal perceptual resolution) is 30 degrees, as reported (e.g., see NPL 2). Then, for example, the range of ITD adjustment may be set so that the angle of the direction of arrival is within approximately 30 degrees. For example, for a signal of 48 kHz sampling, the adjustable range may be set to a range of up to ±three samples. Note that the range of ITD adjustment is not limited to ±three samples, and may another value. Further, the azimuthal perceptual resolution that is referred to when the ITD adjustment range is set is not limited to 30 degrees.

Moreover, ITD adjuster 14 may, for example, perform clipping at an upper limit value or a lower limit value when ITD obtained by ITD analysis exceeds a set range.

In addition, in encoding apparatus 10, in addition to ITD adjustment processing, ILD adjustment processing for adjusting ILD between the L channel and R channel signals may be performed. For example, encoding apparatus 10 may adjust the amplitudes of the L channel and R channel signals so that the ILD between the both channel signals after ITD adjustment processing is zero, that is, the energies of the both channel signals are equal. For example, encoding apparatus 10 may adjust the amplitudes of the L channel and R channel signals to have the average energy of the energies of the both channel signals. When performing amplitude adjustment, encoding apparatus 10 may perform amplitude adjustment such that the amount of the amplitude adjustment is gradually increased from the frame starting point in order to avoid occurrence of discontinuity between frames.

In the amplitude adjustment, encoding apparatus 10 may calculate an amplitude adjustment coefficient (e.g., gain) and multiply each of the both channel signals after ITD adjustment processing by the calculated amplitude adjustment coefficient.

Figure 2:
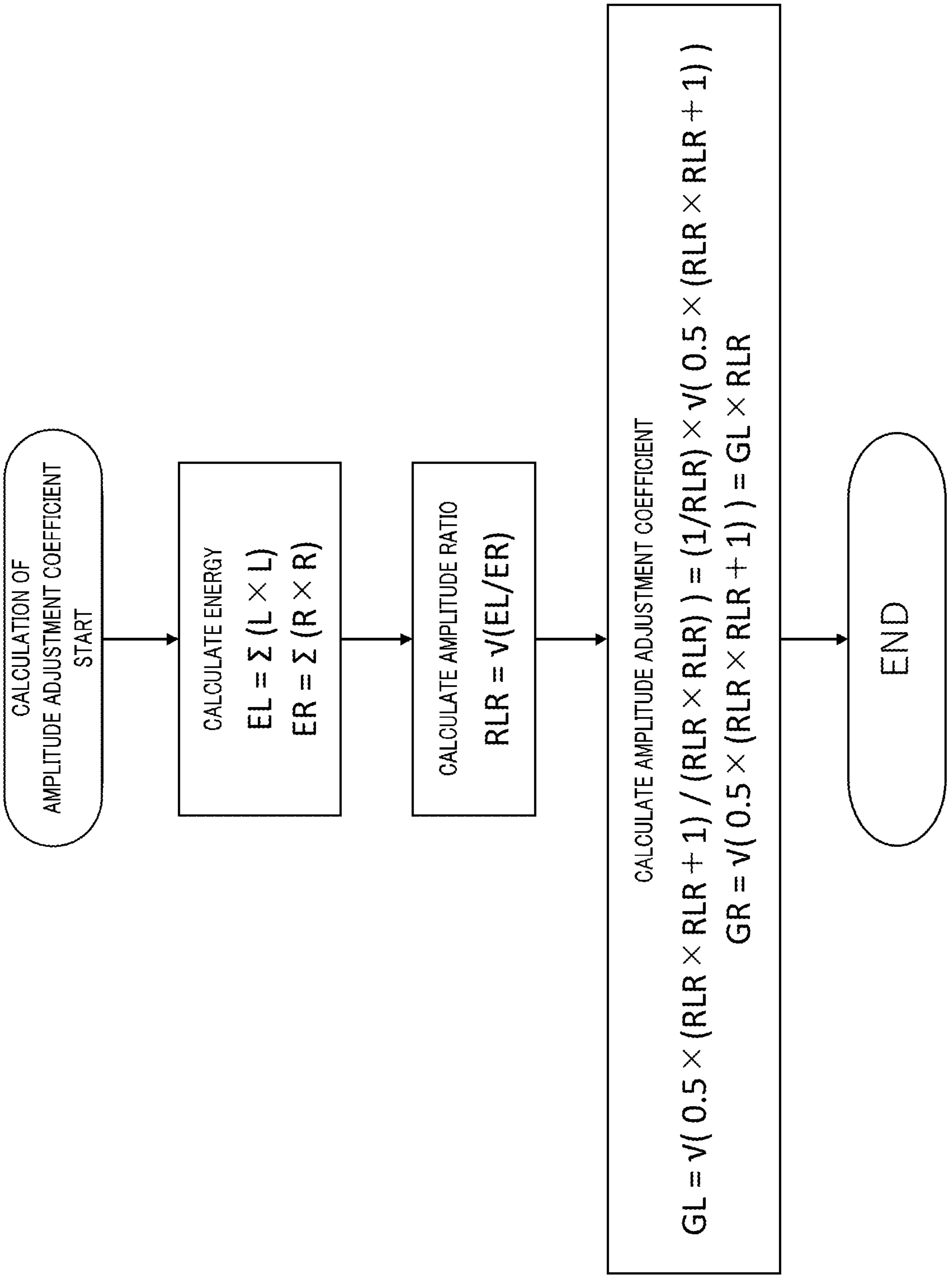
FIG. 2 is a flowchart illustrating exemplary processing of calculating an amplitude adjustment coefficient.

The calculation of the amplitude adjustment coefficient can be performed as illustrated in FIG. 2, for example. In FIG. 2, the calculation procedure of the amplitude adjustment coefficient includes an energy calculation step, an amplitude-ratio calculation step, and an amplitude adjustment coefficient calculation step.

In FIG. 2, in the energy calculation step, frame energies of the L channel signal (L) and R channel signal (R) after ITD adjustment processing (EL and ER) are calculated and outputted to the amplitude-ratio calculation step.

In the amplitude-ratio calculation step, the square root of the ratio between EL and ER is obtained and outputted to the amplitude adjustment coefficient calculation step as an amplitude ratio between L and R (RLR).

Note that, in the amplitude ratio calculation step, when the average energy, power, or magnitudes of the amplitudes of the both channel signals do not exceed a predetermined threshold, the amplitude ratio may be outputted as one without calculating the amplitude ratio. Thus, amplitude adjustment processing is not performed on a low-level signal, and unnecessary processing can be skipped.

In the amplitude adjustment coefficient calculation step, the square root of the ratio between the average value of the square of RLR and one (e.g., 0.5×(RLR×RLR+1)) and the square of RLR (e.g., RLR×RLR) is obtained and set as an amplitude adjustment coefficient for the L channel (GL). Further, in the amplitude adjustment coefficient calculation step, an amplitude adjustment coefficient for the R channel (GR) is obtained by multiplying the GL by RLR. Note that, in the amplitude adjustment coefficient step, in the case that the obtained GL is not within the range of a predetermined threshold (e.g., more than or equal to a lower limit threshold and less than or equal to an upper limit threshold), clipping at the upper limit threshold may be performed when the GL exceeds the upper limit threshold, and clipping at the lower limit threshold may be performed when the GL is below the lower limit threshold. In this way, keeping the amplitude adjustment coefficient within a particular range can avoid an excessively large amplitude change due to the amplitude adjustment.

Note that, as described above, the amplitude adjustment coefficient may be gradually changed from the amplitude adjustment coefficient used in the immediately preceding frame to the amplitude adjustment coefficient calculated for the current frame so that the signal after the amplitude adjustment is smoothly connected between the frames.

Further, the procedure of the amplitude adjustment coefficient calculation is not limited to the processing illustrated in FIG. 2. Further, the amplitude adjustment coefficient is not limited to the value obtained by the processing illustrated in FIG. 2, and may be any value as long as the value is calculated so that the amplitudes (or energies) of both channel signals are equal.

As described above, encoding apparatus 10 may perform processing of bringing ITD close to zero (e.g., ITD adjustment processing) and processing of bringing ILD close to zero (e.g., ILD adjustment processing). This maximizes the correlation between the L channel and R channel signals after ITD adjustment processing, and can make the S channel signal after the conversion into an M/S stereo signal smaller, which enhances the encoding efficiency for stereo signals.

Mixer 15 may, for example, receive the L channel and R channel signals after ITD adjustment processing from ITD adjuster 14 and the mixing control information from conversion/analysis/preprocessing/encoding controller 11. Mixer 15 performs mixing processing between the L channel and R channel signals based on the mixing control information, and outputs the two-channel signals after the mixing processing to CELP-based encoder 16, for example. Exemplary mixing processing in mixer 15 will be described later.

CELP-based encoder 16 may encode each of the two channel signals inputted from mixer 15 (e.g., M/S signals obtained by converting the input stereo signal after ITD adjustment) using a CELP-based codec having a configuration of switching between CELP encoding and MDCT encoding (e.g., multi-mode encoding, multi-mode codec, or multi-mode monaural codec), such as an Enhanced Voice Services (EVS) codec (see NPL 1). CELP-based encoder 16 may output a signal obtained by multiplexing the encoding results of the channels (e.g., "stereo TD encoding information") to switching multiplexer 17.

Switching multiplexer 17 may, for example, multiplex information to be transmitted among the M/S conversion control information and mixing control information inputted from conversion/analysis/preprocessing/encoding controller 11, the stereo FD encoding information inputted from spectrum encoder 13, and the stereo TD encoding information inputted from CELP-based encoder 16, based on the encoding control information inputted from conversion/analysis/preprocessing/encoding controller 11, and output the multiplexed information to a transmission path such as a communication channel or a recording medium such as a storage medium.

Note that, in encoding apparatus 10, for example, either one of the stereo FD encoding information and stereo TD encoding information may be inputted to switching multiplexer 17 based on the encoding control information.

[Exemplary Processing of Encoding Apparatus 10]

Figure 3:
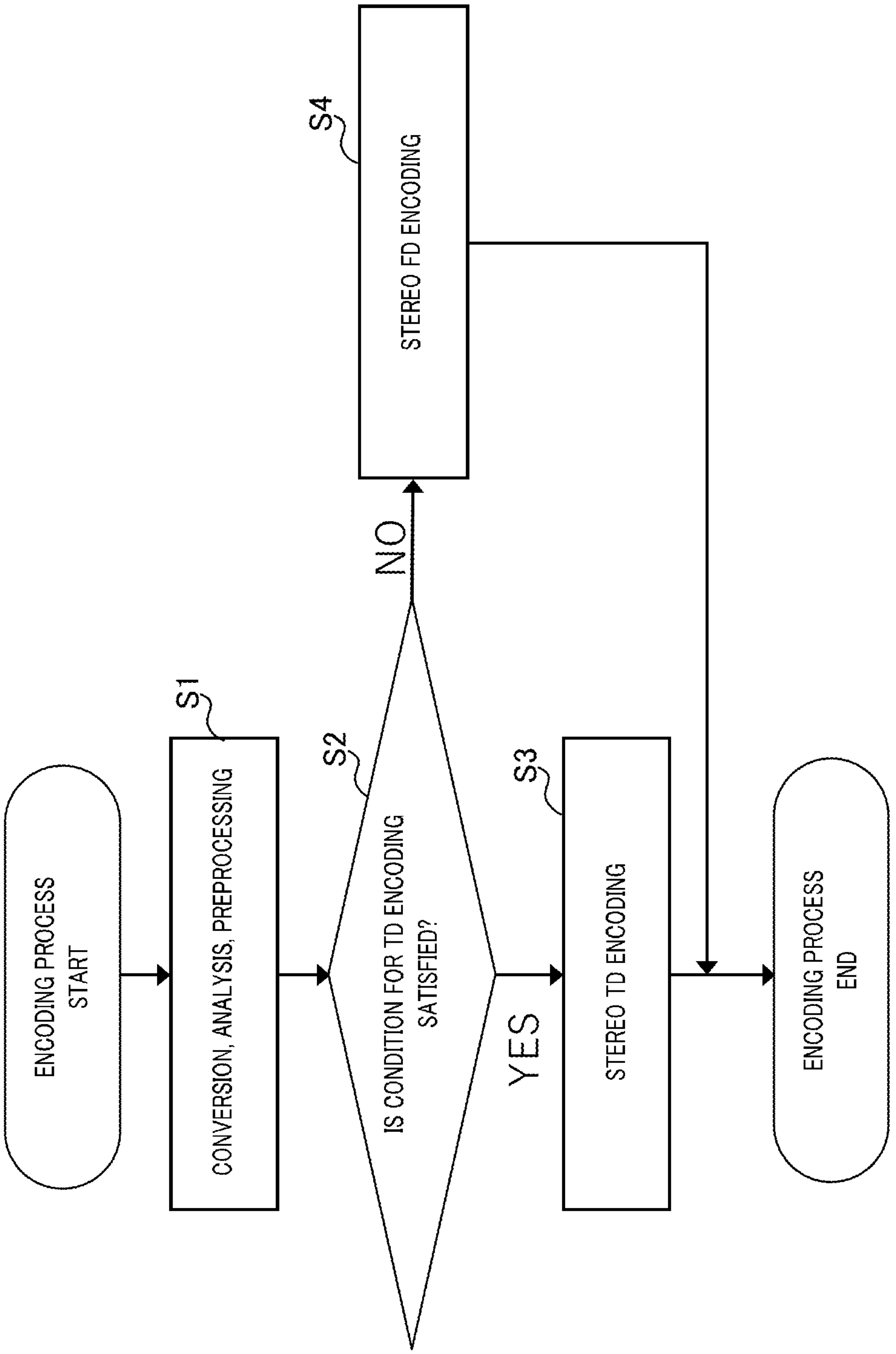
FIG. 3 is a flowchart illustrating exemplary encoding processing.

FIG. 3 is a flowchart illustrating an exemplary processing procedure of encoding apparatus 10.

Conversion/analysis/preprocessing/encoding controller 11 performs, for example, conversion processing, analysis processing, and preprocessing on the L channel and R channel signals (S1).

For example, encoding apparatus 10 determines whether the target frame is a frame using stereo TD encoding (S2). For example, encoding apparatus 10 may determine whether the condition for applying stereo TD encoding is satisfied. Alternatively, for example, encoding apparatus 10 may determine whether the condition for applying stereo FD encoding is satisfied.

Encoding apparatus 10 may determine whether to use stereo TD encoding based on, for example, the analysis result of the inter-channel correlation (ICC) between the L channel and R channel, and the determination may be based on an LR/MS determination algorithm used for stereo FD encoding (e.g., method for determining M/S conversion control). For example, when the inter-channel correlation (ICC) is high (e.g., when the value of ICC is greater than or equal to a threshold), encoding apparatus 10 may determine that the condition for applying stereo TD encoding is satisfied, and when the inter-channel correlation (ICC) is low (e.g., when the value of ICC is less than the threshold), encoding apparatus 10 may determine that the condition for applying stereo TD encoding is not satisfied.

Further, encoding apparatus 10 may analyze, in analysis processing, whether the type of the input stereo signal is a speech signal, for example. The condition for applying stereo TD encoding may be based on, for example, the type of the input stereo signal. For example, encoding apparatus 10 may determine that the condition for applying stereo TD encoding is satisfied when the type of the input stereo signal is a speech signal, and may determine that the condition for applying stereo TD encoding is not satisfied when the type of the input stereo signal is not the speech signal.

Further, the condition for applying stereo TD encoding may be based on, for example, an inter-channel time difference (ITD) of the input stereo signal. For example, encoding apparatus 10 may determine that the condition for applying stereo TD encoding is satisfied when the value of ITD obtained from ITD analysis is within a preset threshold range that is in the vicinity of zero, and determines that the condition for applying stereo TD encoding is not satisfied when the value of ITD is outside the preset threshold range.

Note that the preset range may be, for example, a range expanded to within approximately 50% of the above-described adjustable range of the ITD adjustment processing (e.g., range based on the perceptual resolution). Alternatively, the preset range may be configured so that, when the ITD changes from within the predetermined range to outside the range, or when the ITD changes from outside the predetermined range to within the range, the determination result is changed after the state after the change continues for a certain number of frames. This is to avoid frequent switching between stereo FD encoding and stereo TD encoding between frames for an input signal whose ITD changes near the boundary of the ITD range.

In addition, the condition for applying stereo TD encoding may be based on, for example, a bit rate for the input stereo signal. For example, encoding apparatus 10 may determine that the condition for applying stereo TD encoding is satisfied when a bit rate is less than or equal to a threshold, and may determine that the condition for applying stereo TD encoding is not satisfied when the bit rate is greater than the threshold.

Further, the condition for applying stereo TD encoding may be based on, for example, at least one of the above-described ICC, LR/MS determination algorithm, type of the input stereo signal, ITD, and bit rate.

In FIG. 3, for example, when encoding apparatus 10 determines that a frame uses stereo TD encoding (S2: YES), stereo TD encoding processing is performed (S3). For example, when encoding apparatus 10 determines to apply the above-described stereo TD encoding, encoding apparatus 10 may determine to convert the stereo speech signal from an LR stereo signal into an M/S stereo signal and encode the M and S signals using a CELP-based encoder (e.g., CELP-based encoder 16).

For example, in an EVS codec, which is a monaural system, Algebraic CELP (ACELP) is used for speech coding up to 64 kbit/s (e.g., see NPL 1). Further, it is known that, regarding the coding performance for speech signals, the performance of CELP encoding is higher than that of another encoding at lower to medium bit rates. Thus, as described above, encoding apparatus 10 can enhance the coding performance for speech signals by performing CELP-based stereo TD encoding when the condition is satisfied.

Note that, in stereo TD encoding, encoding apparatus 10 may apply CELP-based encoding to an M signal and may apply encoding different from the CELP-based encoding to an S signal for the stereo speech signal having a high inter-channel correlation.

On the other hand, when encoding apparatus 10 does not determine that the frame uses stereo TD encoding (S2: NO), stereo FD encoding processing is performed (S4).

The processing of encoding apparatus 10 has been described above.

[Exemplary Processing of Stereo TD Encoding]

Figure 4:
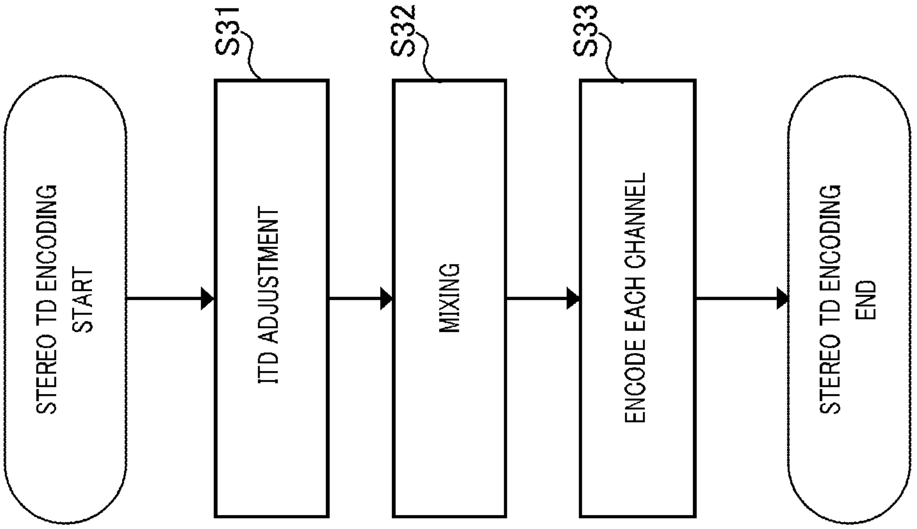
FIG. 4 is a flowchart illustrating exemplary stereo encoding processing.

FIG. 4 is a flowchart illustrating an exemplary processing procedure of stereo TD encoding (e.g., process of S3 illustrated in FIG. 3).

Encoding apparatus 10 performs ITD adjustment processing for adjusting ITD (absolute value of ITD) to less than or equal to a threshold on the L channel and R channel signals (S31).

Encoding apparatus 10 performs mixing processing (e.g., LR to M/S conversion processing in the time domain) on the R channel and L channel signals after the ITD adjustment (S32).

Encoding apparatus 10 performs encoding processing on the two channels after the mixing processing, for example (S33).

[Exemplary Processing of ITD Adjustment]

ITD adjustment processing is performed, for example, after the frame to be encoded is determined to be a frame in which stereo TD encoding is performed (e.g., referred to as “stereo TD encoding frame”). At this time, the stereo TD encoding frame can be classified into the following three types.

(1) The first stereo TD frame (hereinafter, also referred to as “first frame”) after switching from a frame in which stereo FD encoding processing is performed (e.g., referred to as “stereo FD encoding frame”).

(2) A frame following and followed by a stereo TD encoding frame (hereinafter, also referred to as “second frame”). The second frame may be, for example, a frame of which the previous and subsequent frames are not stereo FD frames.

(3) The last stereo TD encoding frame (hereinafter, also referred to as “third frame”). The third frame may be a frame that is to switch to a stereo FD encoding frame in a subsequent frame.

ITD adjustment processing methods for these three types of frames may be different from each other.

For the first frame of (1) described above, an MDCT-based coding mode may be selected in CELP-based encoder 16 as described later, in order to seamlessly connect frames from a stereo FD encoding frame to a stereo TD encoding frame. In the first frame, when ITD is not zero, ITD adjustment processing may be performed to bring ITD close to zero.

At the second frame of (2) described above, the immediately preceding frame is a stereo TD encoding frame, and thus it is highly likely that ITD adjustment processing has been applied. Therefore, encoding apparatus 10 may, for example, perform adjustment processing such that one channel signal is gradually delayed (waveform is shifted to the future direction on the time axis) or gradually advanced (waveform is shifted to the past direction on the time axis), depending on the difference (change) between the ITD in the immediately preceding frame and the ITD in the current frame. For example, when there is no change in ITD between the immediately preceding frame and the current frame (e.g., when the difference (absolute value of the difference) is within a threshold or zero), encoding apparatus 10 need not perform the ITD adjustment processing that gradually changes the signal (e.g., the shift amount of the immediate preceding frame may be maintained).

Further, for example, encoding apparatus 10 may set an upper limit on an ITD adjustment amount (e.g., the number of samples of which one channel signal is delayed) in order to suppress a sudden change in the signal due to the adjustment processing. For example, encoding apparatus 10 may set (e.g., limit) an upper limit (e.g., maximum value) on the number of adjustable samples per frame to one sample. In this case, two or more frames are required to adjust ITD of more than one sample.

For the third frame of (3) described above, because encoding is to be switched to stereo FD encoding in the subsequent frame, ITD adjustment processing is preferably performed so as to restore the adjusted ITD. For example, unlike the first and second frames, in the third frame, the upper limit (e.g., limitation or restriction) on the number of samples to be restored per frame may be removed in order to restore ITD in one frame. For example, encoding apparatus 10 performs processing of gradually advancing (shifting to the past direction on the time axis) the channel that has been delayed by the ITD adjustment processing (shifted to the future direction on the time axis) and returning to the original position.

As described above, encoding apparatus 10 may perform ITD adjustment that gradually shifts a time signal within one sample, on frames other than the third frame immediately preceding the frame in which stereo FD encoding is performed, among a plurality of stereo TD encoding frames (e.g., sections).

Figure 5:
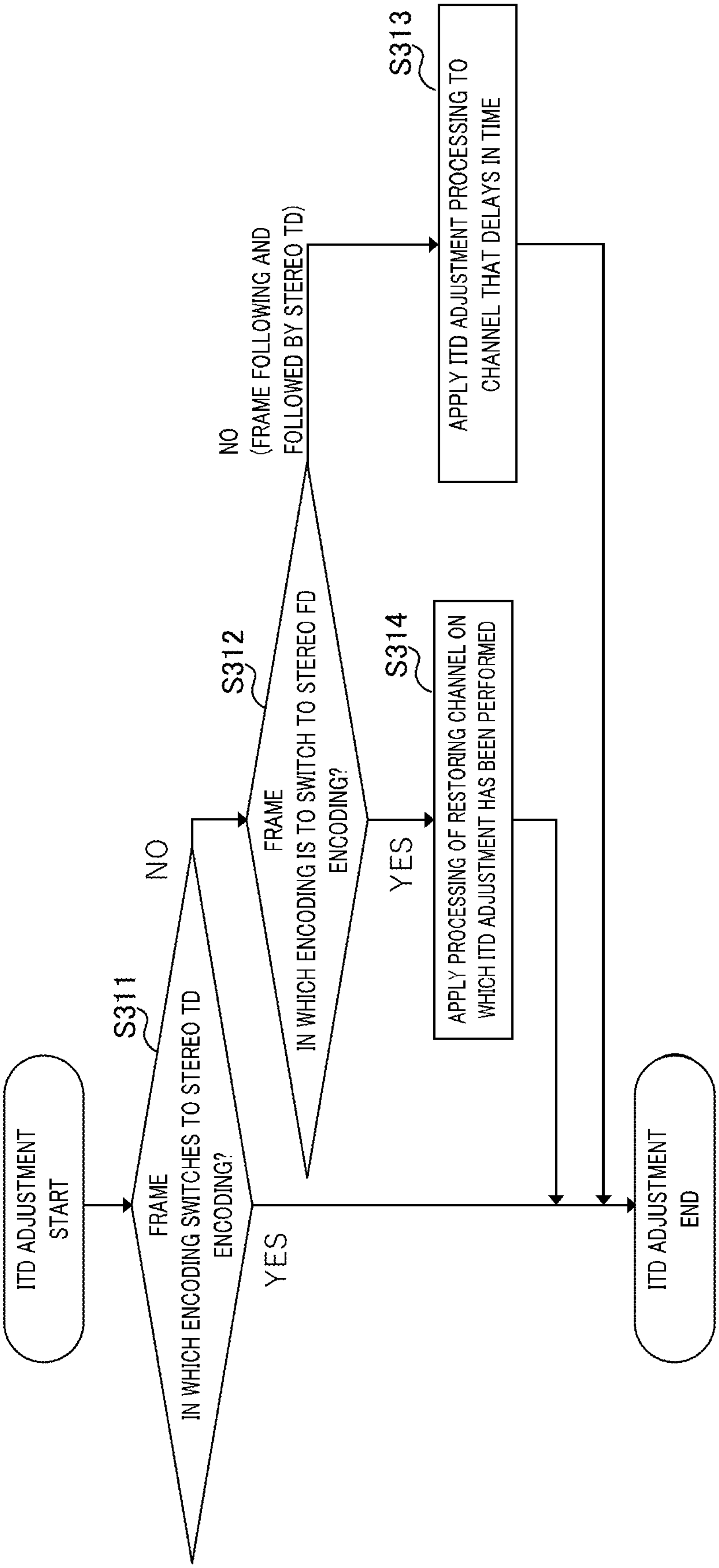
FIG. 5 is a flowchart illustrating exemplary Inter-channel time difference (ITD) adjustment processing.

FIG. 5 is a flowchart illustrating an exemplary processing procedure of the above-described ITD adjustment processing (e.g., process of S31 illustrated in FIG. 4).

In FIG. 5, encoding apparatus 10 determines, for example, whether the frame is the first frame in which encoding switches to stereo TD encoding (S311).

When the frame is a frame in which encoding switches to stereo TD encoding (S311: YES), encoding apparatus 10 need not perform ITD adjustment processing (e.g., end ITD adjustment processing). Note that, as described above, encoding apparatus 10 may perform ITD adjustment processing in this frame. In this case, the process of S311 need not be performed, and the first frame may be treated the same as the second frame.

When the frame is not a frame in which encoding switches to stereo TD encoding (S311: NO), encoding apparatus 10 determines, for example, whether the frame is the third frame, in which encoding is to switch to stereo FD encoding (S312).

When the frame is not a frame in which encoding is to switch to stereo FD encoding (S312: NO), for example, when the frame is the second frame, encoding apparatus 10 may perform ITD adjustment processing (S313).

When the frame is the third frame, in which encoding is to switch to stereo FD encoding (S312: YES), encoding apparatus 10 may perform processing of restoring ITD on the channel on which ITD adjustment has been performed (S314). By this processing, the input signal is consequently outputted as it is, and then ITD adjustment processing ends.

FIG. 6 illustrates a processing flow of the ITD adjustment processing illustrated in FIG. 5 using a pseudo program code.

Note that, in ITD adjustment processing, processing of advancing a signal (e.g., processing of shifting a signal to the past direction on the time axis) and processing of delaying a signal (e.g., processing of shifting a signal to the future direction on the time axis) may be performed, for example, at a resolution of less than one sample to realize a smooth change. This can be performed using an interpolation filter that interpolates between samples. For example, this can be implemented similarly to a long-term prediction filter for fractional delays used in a known CELP codec.

FIG. 7 illustrates an exemplary coefficient set of an interpolation filter (e.g., FIR filter) that performs interpolation using a total of 13 samples with six samples before and after a sample at a 1/24 sample accuracy. The interpolation filter is equivalent to a time-axis inversion of the impulse response of a delay filter that delays a signal with a 1/24 sample accuracy. Note that, a filter of a coefficient set composed of zero and one is described for convenience in FIG. 7, but need not be implemented (e.g., because the input and output do not change or the signal is shifted only by one sample, the filter need not be applied as filtering processing).

For example, when the signal is gradually shifted (or delayed) to the future direction of the time axis by 1/24 sample at a time, the signal can be consequently shifted (delayed) by one sample time by gradually switching from the coefficient set above to the coefficient set below among the coefficient sets illustrated in FIG. 7. For example, in the case that the filters switches every five samples in 48 kHz sampling, the signal can be shifted by one sample over 2.5 ms.

On the other hand, for example, when the signal is gradually shifted to the past direction on the time axis by 1/24 sample at a time, the signal can be consequently advanced by one sample time by gradually switching from the coefficient set below to the coefficient set above among the coefficient sets illustrated in FIG. 7.

[Switching of Coding Modes]

Figure 8:
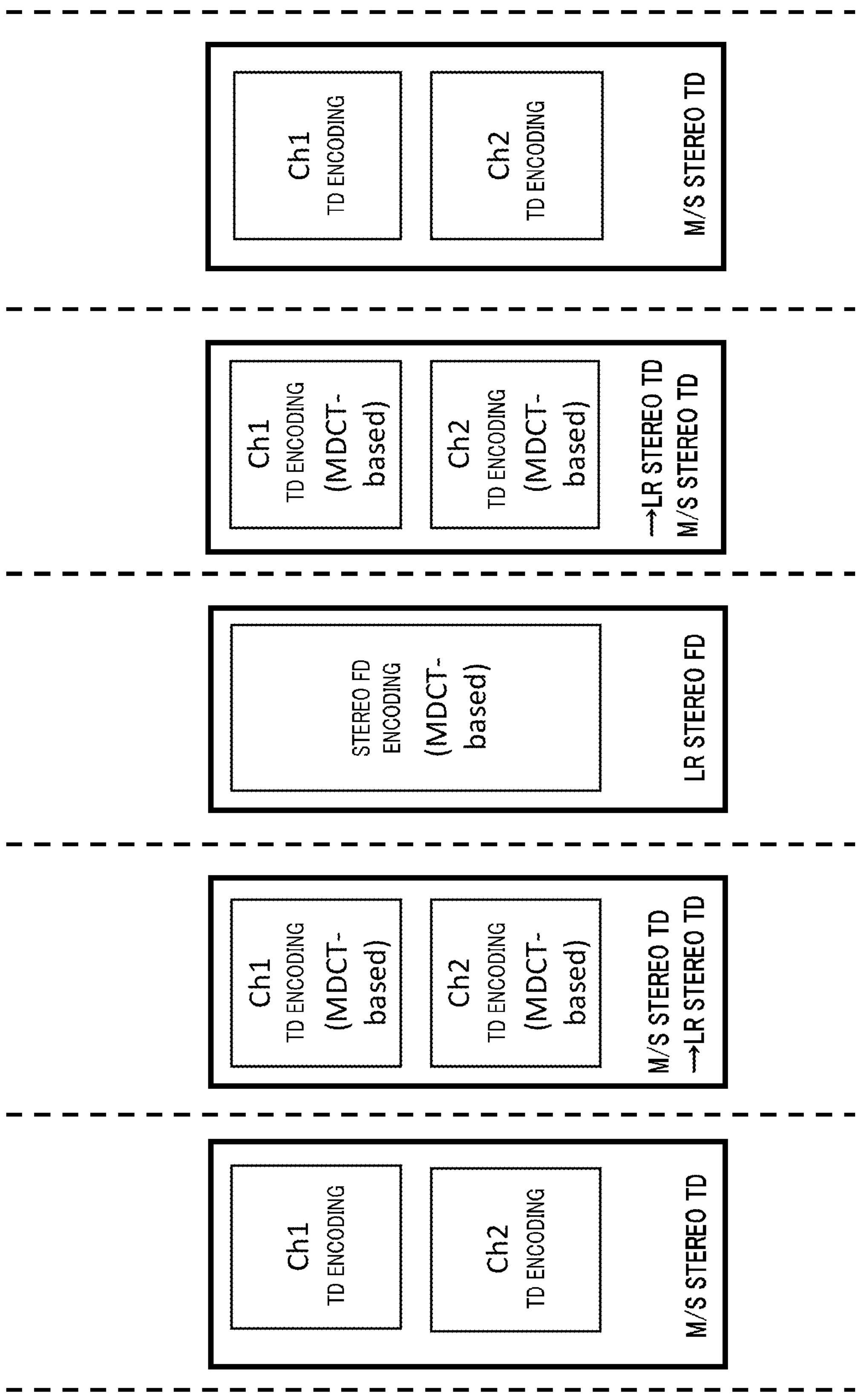
FIG. 8 illustrates exemplary transition of switching coding modes in the encoding system.

FIG. 8 illustrates a state of switching coding modes over five frames in which the three types of stereo TD encoding frames and a stereo FD encoding frame are switched. Time elapses from the left end to the right end of FIG. 8, and the frames are separated by broken lines.

In the example illustrated in FIG. 8, the left-end frame (the first frame from the left) is the second frame of stereo TD encoding frames described above. Further, the second frame from the left is a stereo TD encoding frame immediately before switching to a stereo FD encoding frame (third frame). Furthermore, the third frame from the left is a stereo FD encoding frame. The fourth frame from the left is stereo TD encoding frame (first frame) immediately after switching from the stereo FD encoding frame. The fifth frame from the left (the right-end frame) is the second frame of stereo TD encoding frames similarly to the left-end frame.

In the second frame from the left (third frame) illustrated in FIG. 8, for example, it is preferred to provide a section (e.g., "M/S→LR transition section") in which the signal gradually changes from an M/S stereo signal to an LR stereo signal. For example, in the second frame from the left illustrated in FIG. 8, encoding apparatus 10 may perform M/S→LR transition mixing processing (example will be described later). In the M/S→LR transition mixing processing, for example, the encoding could be set to the same type of MDCT-based coding mode as in stereo FD encoding for a seamless (or smooth) connection to the subsequent stereo FD encoding frame. The MDCT-based coding mode may include, for example, MDCT-based Transform coded excitation (TCX) mode for the EVS codec.

Further, in the fourth frame illustrated in FIG. 8 (first frame), for example, it is preferred to provide a section (e.g., "LR→M/S transition section") in which the signal gradually changes from an LR stereo signal to an M/S stereo signal. For example, in the fourth frame from the left illustrated in FIG. 8, encoding apparatus 10 may perform LR→M/S transition mixing processing (example will be described later). In the LR→M/S transition mixing processing, for example, the encoding could be set to the same type of MDCT-based coding mode as in stereo FD encoding for a seamless (or smooth) connection to the immediately preceding stereo FD encoding frame.

As described above, encoding apparatus 10 may perform MDCT-based encoding for stereo TD encoding in a frame adjacent to the frame in which stereo FD encoding is performed, among a plurality of consecutive frames (e.g., sections) in which stereo TD encoding is performed. For example, encoding apparatus 10 may perform encoding based on the coding mode in stereo FD encoding (e.g., MDCT-based coding mode) in at least one of an M/S→LR transition section in which encoding is switched from stereo TD encoding to stereo FD encoding and/or an LR→M/S transition section in which encoding is switched from stereo FD encoding to stereo TD encoding, among frames in which stereo TD encoding is performed.

FIG. 9 illustrates exemplary mixing processing (processing on the encoding side) and inverse mixing processing (processing on the decoding side) corresponding to the switching transition between stereo TD encoding and stereo FD encoding illustrated in FIG. 8. Time elapses from the left end to the right end of FIG. 9, and the frames are separated by broken lines. Further, the types of the five frames illustrated in FIG. 9 (e.g., any of a stereo FD encoding frame and the first to third frames of stereo TD encoding frames) are the same as those illustrated in FIG. 8.

For example, general LR→M/S conversion processing may be performed on the left-end and right-end frames corresponding to the second frame following and followed by a stereo TD encoding frame among stereo TD encoding frames illustrated in FIG. 9.

At this time, the channel conversion processing (mixing processing) is expressed by, for example, the following Equation 1.

$$\begin{pmatrix} M_n \\ S_n \end{pmatrix} = D\begin{pmatrix} L_n \\ R_n \end{pmatrix}, \quad D = \begin{pmatrix} 0.5 & 0.5 \\ -0.5 & 0.5 \end{pmatrix} \qquad \text{(Equation 1)}$$

In Equation 1, the Ln and Rn respectively represent an L channel signal and an R channel signal before the conversion processing, and the subscript n represents a time (sample number). Further, in Equation 1, the $M_n$ and $S_n$ respectively represent an M channel signal and an S channel signal after the conversion processing.

For example, channel conversion processing (mixing processing) expressed by the following Equation 2 may be performed on the second frame from the left corresponding to the third frame that corresponds to the M/S→LR transition section, among stereo TD encoding frames illustrated in FIG. 9.

$$\begin{pmatrix} M_n \\ S_n \end{pmatrix} = D\begin{pmatrix} L_n \\ R_n \end{pmatrix}, \quad D = \frac{1}{2}\begin{pmatrix} 1+\alpha_n & 1-\alpha_n \\ -1+\alpha_n & 1+\alpha_n \end{pmatrix}, \quad \alpha_n = \frac{n}{N},\ n = 0, \ldots, N-1 \qquad \text{(Equation 2)}$$

The letter N herein represents a frame length (or transition section length). The transition section length N may be shorter than one frame, for example.

By the mixing processing expressed by Equation 2, the stereo signal gradually transitions from an M/S signal to an LR signal over time n.

For example, channel conversion processing (mixing processing) expressed by the following Equation 3 may be performed on the fourth frame from the left corresponding to the first frame that corresponds to the LR→M/S transition section, among stereo TD encoding frames illustrated in FIG. 9.

$$\begin{pmatrix} M_n \\ S_n \end{pmatrix} = D\begin{pmatrix} L_n \\ R_n \end{pmatrix}, \quad D = \frac{1}{2}\begin{pmatrix} 2-\alpha_n & \alpha_n \\ -\alpha_n & 2-\alpha_n \end{pmatrix}, \quad \alpha_n = \frac{n}{N},\ n = 0, \ldots, N-1 \qquad \text{(Equation 3)}$$

The letter N herein represents a frame length (or transition section length). The transition section length N may be shorter than one frame, for example.

By the mixing processing expressed by Equation 3, the stereo signal gradually transitions from an LR signal to an M/S signal over time n.

As described above, performing transition of the coding modes and the mixing processing makes it possible to seamlessly switch between CELP encoding and MDCT encoding and switch between M/S stereo and LR stereo in stereo TD encoding frames and stereo FD encoding frames.

[Exemplary Configuration of Decoding System]

Figure 10:
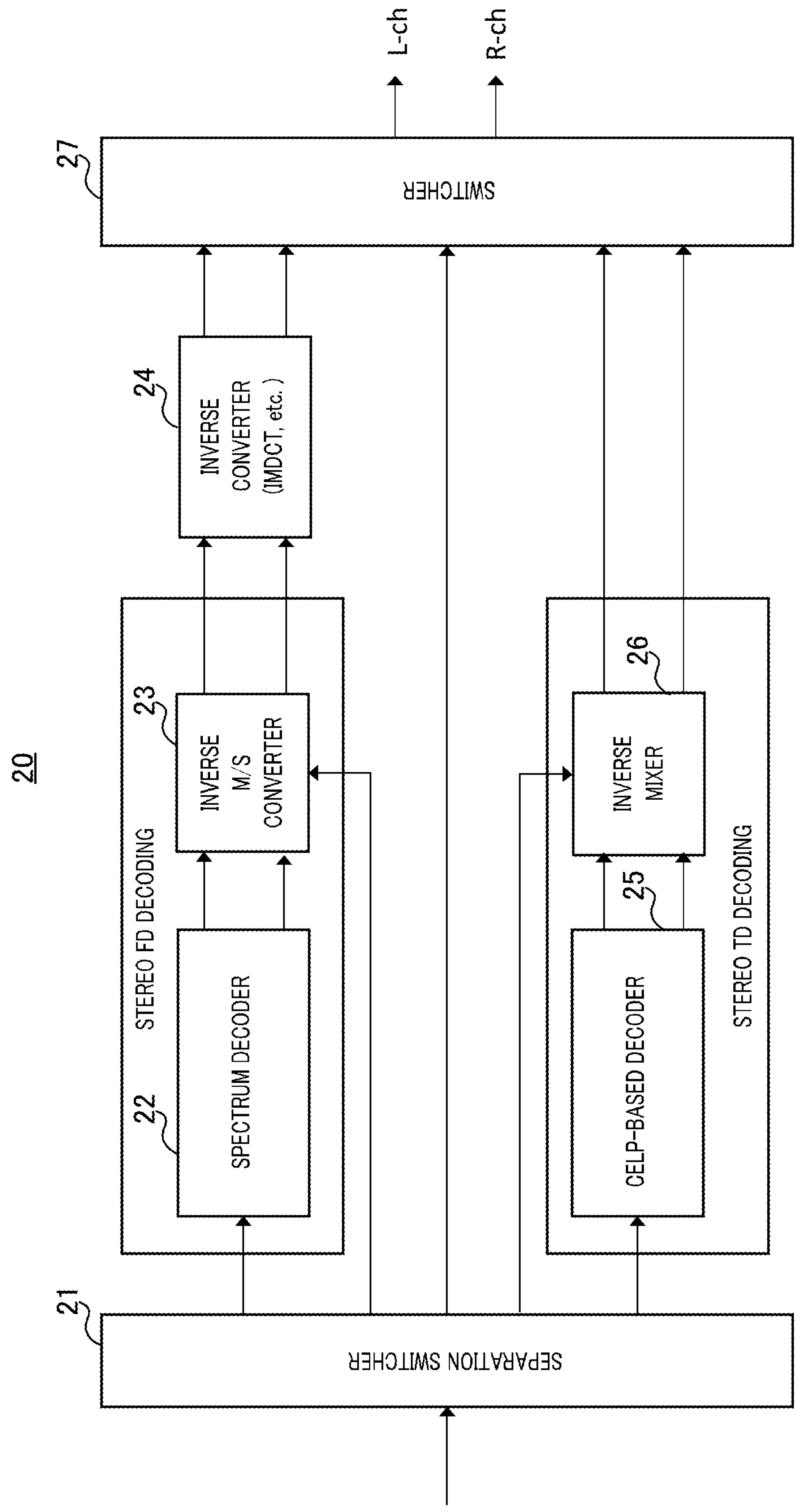
FIG. 10 illustrates an exemplary configuration of a decoding system.

FIG. 10 illustrates an exemplary configuration of a decoding apparatus (also referred to as "decoding system") 20.

Decoding apparatus 20 may include, for example, separation switcher 21, spectrum decoder 22, inverse M/S converter 23, inverse converter 24, CELP-based decoder 25, inverse mixer 26, and switcher 27.

Separation switcher 21 receives, for example, multiplexed encoding information from a transmission path such as a communication channel or a recording medium such as a storage medium. Separation switcher 21 may, for example, separate the encoding information into a plurality of pieces of control information and switch output destinations of the separated pieces of control information.

For example, when the encoding information includes stereo FD encoding information, separation switcher 21 may output the stereo FD encoding information (e.g., spectrum encoding information) to spectrum decoder 22 and output M/S conversion control information to inverse M/S converter 23.

Further, for example, when the encoding information includes stereo TD encoding information, separation switcher 21 may output the stereo TD encoding information (e.g., encoding information of CELP-based encoder 16) to CELP-based decoder 25 and output mixing control information to inverse mixer 26.

Further, separation switcher 21 may, for example, output information indicating which of the stereo FD encoding information and stereo TD encoding information has been transmitted (or which of the stereo FD encoding and stereo TD encoding has been applied) to switcher 27.

In decoding apparatus 20, spectrum decoder 22 and inverse M/S converter 23 may constitute a stereo FD decoder that decodes stereo encoding information in the frequency domain (e.g., referred to as "stereo FD decoding").

For example, spectrum decoder 22 receives the spectrum encoding information outputted from separation switcher 21, decodes spectrum information of two channels, and outputs the decoded information to inverse M/S converter 23.

Inverse M/S converter 23 receives the decoded spectra of the two channels outputted from spectrum decoder 22 and the M/S conversion control information outputted from separation switcher 21, performs inverse M/S conversion on the decoded spectra of the two channels based on the M/S conversion control information, and outputs LR stereo spectra (e.g., MDCT spectra) to inverse converter 24.

For example, inverse converter 24 receives the LR stereo signals (MDCT spectra) outputted from inverse M/S converter 23, performs inverse conversion (e.g., Inverse MDCT (IMDCT)) processing, and outputs the LR stereo signals (time signals) to switcher 27.

In decoding apparatus 20, CELP-based decoder 25 and inverse mixer 26 may constitute a stereo TD decoder that decodes stereo encoding information in the time domain (e.g., referred to as "stereo TD decoding").

For example, CELP-based decoder 25 receives the encoding information of CELP-based encoder 16 outputted from separation switcher 21, decodes the two-channel speech signals, and outputs the decoded speech signals to inverse mixer 26.

For example, inverse mixer 26 receives the decoded two-channel speech signals outputted from CELP-based decoder 25, performs inverse mixing processing on the decoded two-channel speech signals based on the mixing control information outputted from separation switcher 21, reconfigures LR stereo signals, and outputs the reconfigured signals to switcher 27.

For example, switcher 27 receives the information outputted from separation switcher 21, receives the decoded LR stereo signals from either inverse converter 24 or inverse mixer 26 depending on the information, and outputs the decoded stereo signals as final LR stereo signals (e.g., L channel and R channel signals).

Note that, as described above, decoding apparatus 20 (decoding system) need not perform processing corresponding to ITD adjustment processing performed in stereo TD encoding (e.g., inverse adjustment processing for restoring adjusted ITD).

Further, exemplary inverse mixing processing corresponding to switching transition between stereo TD decoding and stereo FD decoding is illustrated in FIG. 9.

For example, general M/S→LR conversion processing may be performed on the left-end and right-end frames corresponding to the second frame following and followed by a stereo TD encoding frame among stereo TD encoding frames illustrated in FIG. 9.

At this time, the channel conversion processing (inverse mixing processing) is expressed by, for example, the following Equation 4.

$$\begin{pmatrix} L_n \\ R_n \end{pmatrix} = U\begin{pmatrix} M_n \\ S_n \end{pmatrix}, \quad U = \begin{pmatrix} 1 & -1 \\ 1 & 1 \end{pmatrix} \qquad \text{(Equation 4)}$$

For example, channel conversion processing (inverse mixing processing) expressed by the following Equation 5 may be performed on the second frame from the left corresponding to the third frame that corresponds to the M/S→LR transition section, among stereo TD encoding frames illustrated in FIG. 9.

$$\begin{pmatrix} L_n \\ R_n \end{pmatrix} = \frac{1}{1+\alpha_n^2}U\begin{pmatrix} M_n \\ S_n \end{pmatrix}, \quad U = \begin{pmatrix} 1+\alpha_n & -1+\alpha_n \\ 1-\alpha_n & 1+\alpha_n \end{pmatrix}, \quad \alpha_n = \frac{n}{N},\ n = 0, \ldots, N-1 \qquad \text{(Equation 5)}$$

By the inverse mixing processing expressed by Equation 5, the decoded stereo signal gradually transitions from an M/S signal to an LR signal over time n.

For example, channel conversion processing (inverse mixing processing) expressed by the following Equation 6 may be performed on the fourth frame from the left corresponding to the first frame that corresponds to the LR→M/S transition section, among stereo TD encoding frames illustrated in FIG. 9.

$$\begin{pmatrix} L_n \\ R_n \end{pmatrix} = \frac{1}{1-\alpha_n+0.5\alpha_n^2}U\begin{pmatrix} M_n \\ S_n \end{pmatrix}, \quad U = \begin{pmatrix} 1-\frac{1}{2}\alpha_n & -\frac{1}{2}\alpha_n \\ \frac{1}{2}\alpha_n & 1-\frac{1}{2}\alpha_n \end{pmatrix}, \quad \alpha_n = \frac{n}{N},\ n = 0, \ldots, N-1 \qquad \text{(Equation 6)}$$

By the inverse mixing processing expressed by Equation 6, the decoded stereo signal gradually transitions from an LR signal to an M/S signal over time n.

As described above, performing transition of the coding modes and the inverse mixing processing makes it possible to seamlessly switch between CELP encoding and MDCT encoding and switch between M/S stereo and LR stereo in stereo TD encoding frames and stereo FD encoding frames.

The exemplary decoding system has been described above.

As described above, in the present embodiment, when determining that an input stereo signal is suitable for encoding using a full M/S coding mode, encoding apparatus 10 determines either conversion of an input stereo signal into an M/S signal in the time domain and application of stereo TD encoding or stereo FD encoding, depending on the condition (e.g., type of the input stereo signal). Then, encoding apparatus 10 encodes an M/S signal when applying stereo TD encoding, or encodes the input stereo signal in the frequency domain when applying stereo FD encoding.

For example, when the input stereo signal is a speech signal in a full M/S coding mode, encoding apparatus 10 may apply CELP-based encoding. For example, encoding apparatus 10 may use a codec that switches between MDCT encoding and CELP encoding (MDCT/CELP switching hybrid codec), for example. Accordingly, encoding apparatus 10 can enhance coding performance for speech signals by using CELP encoding at low bit rates.

In addition, for example, encoding apparatus 10 adjusts an inter-channel time difference (ITD) between an L channel and an R channel in the input stereo signal to less than or equal to a threshold (e.g., in the vicinity of zero) in stereo TD encoding, and performs encoding on the M/S signal after ITD adjustment.

Accordingly, for example, ITD can be made close to zero in encoding of a speech signal using an M/S stereo scheme, which avoids ITD from affecting coding performance and enhances coding performance for stereo signals using CELP encoding. Further, in the present embodiment, ITD adjustment processing is performed by encoding apparatus 10 but not performed by decoding apparatus 20. Thus, information on ITD adjustment need not be transmitted to decoding apparatus 20, which suppresses an increase in the amount of encoding information or the processing amount of decoding apparatus 20.

Note that, in the above-described embodiment, a case in which a "full M/S coding mode" is selected has been described as a case in which the input stereo signal is determined to be a signal suitable for encoding using only an M/S stereo scheme, but the present disclosure is not limited thereto.

For example, the determination of selecting the full M/S coding mode may be determined based on whether a percentage of bands determined to use the M/S stereo scheme among a plurality of bands (sub-bands) of the frequency spectrum of the input stereo signal is greater than or equal to a threshold. For example, when the percentage of bands determined to use the M/S stereo scheme is greater than or equal to the threshold, the full M/S coding mode may be selected.

Alternatively, the determination of selecting the full M/S coding mode may be performed based on whether the M/S stereo scheme is determined to be used in all of a plurality of bands of the frequency spectrum of the input stereo signal. For example, when the M/S stereo scheme is determined to be used in all of the bands, the full M/S coding mode may be selected.

Further, the parameters used in the above-described embodiment, such as the number of frames, the number of samples, the angle of resolution, and the thresholds, are merely examples, and may be other values.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

An encoding apparatus according to an embodiment of the present disclosure includes: control circuitry, which, in operation, determines, when determining that an input stereo signal is suitable for encoding using a mid-side stereo scheme, either conversion of the input stereo signal into a mid-side signal in a time domain and application of first encoding or application of second encoding, depending on a condition; first encoding circuitry, which, in operation, encodes the mid-side signal when the first encoding is applied; and second encoding circuitry, which, in operation, encodes the input stereo signal in a frequency domain when the second encoding is applied.

In the embodiment of the present disclosure, the first encoding includes Code-Excited-Linear-Prediction (CELP) based encoding, and the second encoding includes Modified Discrete Cosine Transform (MDCT) based encoding.

In the embodiment of the present disclosure, the first encoding is multi-mode encoding and further includes Modified Discrete Cosine Transform (MDCT) based encoding.

In the embodiment of the present disclosure, the condition is based on a type of the input stereo signal, and the control circuitry determines to apply the first encoding when the type is a speech signal.

In the embodiment of the present disclosure, the condition is based on an inter-channel time difference between a left channel and a right channel in the input stereo signal, and the control circuitry determines to apply the first encoding when the inter-channel time difference is within a threshold range.

In the embodiment of the present disclosure, the condition is based on a correlation between a left channel and a right channel in the input stereo signal, and the control circuitry determines to apply the first encoding when the correlation is greater than or equal to a threshold.

In the embodiment of the present disclosure, the condition is based on a bit rate, and the control circuitry determines to apply the first encoding when the bit rate is less than or equal to a threshold.

In the embodiment of the present disclosure, the determination is based on whether a percentage of bands determined to use the mid-side stereo scheme among a plurality of bands of a frequency spectrum of the input stereo signal is greater than or equal to a threshold, or whether the mid-side stereo scheme is determined to be used in all of the plurality of bands.

In the embodiment of the present disclosure, the encoding apparatus further includes adjustment circuitry, which, in operation, performs adjustment processing of bringing an inter-channel time difference between a left channel and a right channel in the input stereo signal close to zero, in which the first encoding circuitry encodes the mid-side signal obtained by converting the input stereo signal after the inter-channel time difference is adjusted.

In the embodiment of the present disclosure, a range of adjustment for the inter-channel time difference is based on an angular resolution for reproducing a speech signal.

In the embodiment of the present disclosure, the control circuitry performs Modified Discrete Cosine Transform (MDCT) based encoding of the first encoding in a section adjacent to a section in which the second encoding is performed, among consecutive sections in which the first encoding is performed.

In an encoding method according to an embodiment of the present disclosure, an encoding apparatus determines, when determining that an input stereo signal is suitable for encoding using a mid-side stereo scheme, either conversion of the input stereo signal into a mid-side signal in a time domain and application of first encoding or application of second encoding, depending on a condition, encodes the mid-side signal when the first encoding is applied, and encodes the input stereo signal in a frequency domain when the second encoding is applied.

The disclosure of Japanese Patent Application No. 2022-017997, filed on Feb. 8, 2022, and Japanese Patent Application No. 2022-143856, filed on Sep. 9, 2022, including the specification, drawings and abstract, is incorporated herein by reference in its entirety.

INDUSTRIAL APPLICABILITY

An exemplary embodiment of the present disclosure is useful for encoding systems and/or the like.

REFERENCE SIGNS LIST

10 Encoding apparatus
11 Conversion/analysis/preprocessing/encoding controller
12 M/S converter
13 Spectrum encoder
14 ITD adjuster
15 Mixer
16 CELP-based encoder
17 Switching multiplexer
20 Decoding apparatus
21 Separation switcher
22 Spectrum decoder
23 Inverse M/S converter
24 Inverse converter
25 CELP-based decoder
26 Inverse mixer
27 Switcher

The invention claimed is:

1. An encoding apparatus, comprising:

control circuitry, which, in operation, determines, when determining that an input stereo signal is suitable for encoding using a mid-side stereo scheme, either conversion of the input stereo signal into a mid-side signal in a time domain and application of first encoding or application of second encoding, depending on a condition;

first encoding circuitry, which, in operation, encodes the mid-side signal when the first encoding is applied; and second encoding circuitry, which, in operation, encodes the input stereo signal in a frequency domain when the second encoding is applied, wherein the determination is based on whether a percentage of bands determined to use the mid-side stereo scheme among a plurality of bands of a frequency spectrum of the input stereo signal is greater than or equal to a threshold, or whether the mid-side stereo scheme is determined to be used in all of the plurality of bands.

2. The encoding apparatus according to claim 1, wherein the first encoding includes Code-Excited-Linear-Prediction (CELP) based encoding, and the second encoding includes Modified Discrete Cosine Transform (MDCT) based encoding.

3. The encoding apparatus according to claim 2, wherein the first encoding is multi-mode encoding and further includes Modified Discrete Cosine Transform (MDCT) based encoding.

4. The encoding apparatus according to claim 1, wherein the condition is based on a type of the input stereo signal, and the control circuitry determines to apply the first encoding when the type is a speech signal.

5. The encoding apparatus according to claim 1, wherein the condition is based on an inter-channel time difference between a left channel and a right channel in the input stereo signal, and the control circuitry determines to apply the first encoding when the inter-channel time difference is within a threshold range.

6. The encoding apparatus according to claim 1, wherein the condition is based on a correlation between a left channel and a right channel in the input stereo signal, and the control circuitry determines to apply the first encoding when the correlation is greater than or equal to a second threshold.

7. The encoding apparatus according to claim 1, wherein the condition is based on a bit rate, and the control circuitry determines to apply the first encoding when the bit rate is less than or equal to a second threshold.

8. The encoding apparatus according to claim 1, further comprising:

adjustment circuitry, which, in operation, performs adjustment processing of bringing an inter-channel time difference between a left channel and a right channel in the input stereo signal close to zero, wherein the first encoding circuitry encodes the mid-side signal obtained by converting the input stereo signal after the inter-channel time difference is adjusted.

9. The encoding apparatus according to claim 8, wherein a range of adjustment for the inter-channel time difference is based on an angular resolution for reproducing a speech signal.

10. The encoding apparatus according to claim 8, wherein the control circuitry performs Modified Discrete Cosine Transform (MDCT) based encoding of the first encoding in a first section adjacent to a second section in which the second encoding is performed, among consecutive sections in which the first encoding is performed.

11. An encoding method, comprising:

determining, by an encoding apparatus, when determining that an input stereo signal is suitable for encoding using a mid-side stereo scheme, either conversion of the input stereo signal into a mid-side signal in a time domain and application of first encoding or application of second encoding, depending on a condition;

encoding, by the encoding apparatus, the mid-side signal when the first encoding is applied; and encoding, by the encoding apparatus, the input stereo signal in a frequency domain when the second encoding is applied, wherein the determining is based on whether a percentage of bands determined to use the mid-side stereo scheme among a plurality of bands of a frequency spectrum of the input stereo signal is greater than or equal to a threshold, or whether the mid-side stereo scheme is determined to be used in all of the plurality of bands.

* * * * *